(12) United States Patent
Schapeler et al.

(10) Patent No.: US 8,928,206 B2
(45) Date of Patent: Jan. 6, 2015

(54) METHOD FOR OBTAINING ELECTRICAL ENERGY FROM THE KINETIC ENERGY OF WAVES

(75) Inventors: Dirk Schapeler, Mountain View, CA (US); Christian Graf, Paderborn (DE); Jürgen Maas, Detmold (DE)

(73) Assignee: Bayer MaterialScience AG, Leverkusen (DE)

( * ) Notice: Subject to any disclaimer, the term of this patent is extended or adjusted under 35 U.S.C. 154(b) by 548 days.

(21) Appl. No.: 13/381,709

(22) PCT Filed: Jun. 19, 2010

(86) PCT No.: PCT/EP2010/003709
§ 371 (c)(1),
(2), (4) Date: Feb. 10, 2012

(87) PCT Pub. No.: WO2011/000486
PCT Pub. Date: Jan. 6, 2011

(65) Prior Publication Data
US 2012/0126667 A1    May 24, 2012

(30) Foreign Application Priority Data
Jul. 2, 2009  (EP) .................................... 09008697

(51) Int. Cl.
*H01L 41/113*   (2006.01)
*H01L 41/107*   (2006.01)

(52) U.S. Cl.
USPC ........................... 310/339; 310/317; 310/318

(58) Field of Classification Search
USPC .................................. 310/314, 317–319, 339
See application file for complete search history.

(56) References Cited

U.S. PATENT DOCUMENTS 8,104,278 B2 *  1/2012  Browne et al. .................. 60/527

FOREIGN PATENT DOCUMENTS

| WO | 0106575 A1 | 1/2001 |
| WO | 2007130252 A2 | 11/2007 |

* cited by examiner

*Primary Examiner* — Thomas Dougherty
(74) *Attorney, Agent, or Firm* — John E. Mrozinski, Jr.

(57) ABSTRACT

The invention relates to a method for obtaining electrical energy from the kinetic energy waves. According to said method, a device is provided in the water, comprising an electroactive polymer that can expand with the action of the waves. When the electroactive polymer expands, an electrical charge is applied at a specific time for a specific time interval. Said electrical charge is removed during the relaxation of the polymer, except for a residual charge. According to said method, the variables of the electrical target charge required for the operation of the method, and the time intervals for the beginning and end of the charging and discharging of the electroactive polymer are determined. The invention also relates to a system for obtaining electrical energy and to a computer program product comprising commands that can be implemented by a microprocessor for carrying out the calculations in the method according to the invention.

10 Claims, 3 Drawing Sheets

METHOD FOR OBTAINING ELECTRICAL ENERGY FROM THE KINETIC ENERGY OF WAVES

Figure 1:
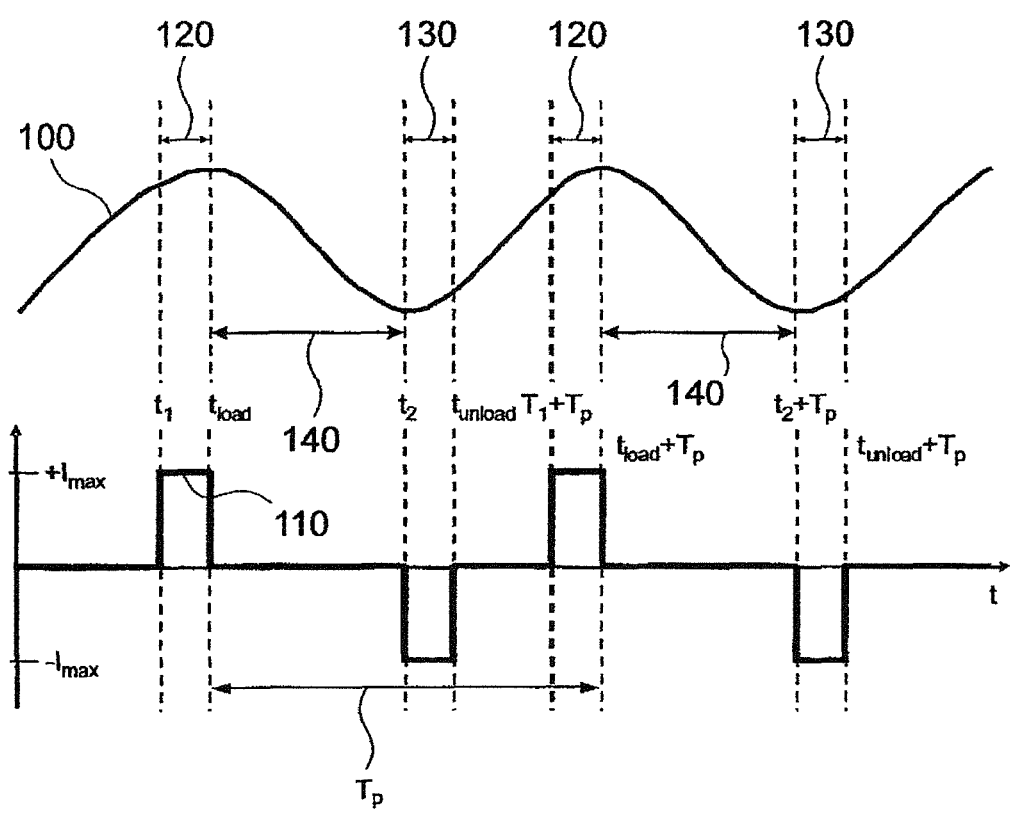

The present invention relates to a method for harvesting electrical energy from the kinetic energy of water waves. In the method, a device comprising an electroactive polymer which can expand under the action of the water waves is provided in the water. When the electroactive polymer expands, an electrical load, a voltage or electric field strength is applied at a specific time for a specific time interval. This is removed, apart from a residual load, on relaxation of the polymer. In the method, the parameters, required for carrying out the method, of the target electrical load and of the times for the start and end of the loading and unloading of the electroactive polymer are determined.

The harvesting of energy from water waves by means of electroactive polymer generators (EAP generators) is based on the principle of converting potential wave energy into an expansion of the EAP generator in a first stage, which is then finally converted into electrical energy using an energy harvesting cycle (EHC).

Examples of electromechanical converters are to be found in WO 2001/06575 A1. This patent application relates to converters, to their use and to their production. Such a converter for converting mechanical energy into electrical energy comprises at least two electrodes and a polymer. The polymer is so arranged that an electric field is changed as a result of a change in the length of a first portion. A second portion of the polymer is further biased elastically.

WO 2007/130252 A2 discloses systems and methods which use an EAP converter for converting mechanical energy originally contained in one or more waves. Devices for use in the sea can employ a mechanical energy conversion system which transmits mechanical energy suitable for acting on the EAP converter. Such a marine device comprises a body, a portion of the body being located above the water surface when the device is floating in the water. The device further comprises a system for transmitting mechanical energy from a change in the level of the water surface into mechanical energy regulated by the system. An EAP converter is coupled to part of the system for transmitting mechanical energy and configured to produce electrical energy from the regulated mechanical energy in the system for transmitting mechanical energy. The EAP converter has an electroactive polymer and at least two electrodes coupled to the electroactive polymer.

In addition to the mechanically suitable arrangement, optimisation of the energy harvesting cycle represents a fundamental possibility for increasing the energy efficiency of EAP generators. The control or regulation concept for the loading/unloading operations in particular makes an important contribution in this connection.

From the theoretical point of view, the following cycle is desirable for the optimum conversion efficiency of EAP generators, which cycle represents a theoretical limit cycle:

1st phase: the EAP generator is expanded on the basis of an external application of force. This force is produced, for example, by using the change in potential energy, as occurs with wave movements.

2nd phase: at maximum expansion of the EAP generator, electrical loads are applied to the arrangement consisting of a polymer introduced between two flexible electrodes. The arrangement, which from an electrical point of view is to be regarded as a capacitor with variable capacity, is loaded until the electrical disruptive strength is reached.

3rd phase: when the externally acting force is reduced, the EAP relaxes due to the elastic return forces acting in the polymer. During this process, the electrical energy stored in the EAP generator increases. This phase describes the energy conversion process of mechanical energy into electrical energy.

4th phase: as soon as the elastic return forces within the polymer are equal in terms of amount to the oppositely directed force, which is caused by the electrostatic pressure of the loaded capacitor, the EAP does not contract further and the arrangement should be unloaded. After this process, the EAP has reached its initial length again due to the reducing electrostatic pressure.

From a practical point of view, the theoretical cycle described above can be passed through only approximately. The theoretically desirable operation at the electrical disruptive strength can in practice lead to damage to the arrangement. For this reason, the applied field strength must be below the electrical disruptive strength throughout the energy harvesting cycle. However, the higher the field strength that can be chosen, the higher the energy harvest of the EAP generator.

It is further possible to configure the cycle of the EAP generator for the 3rd phase in such a manner that, instead of being subjected to a constant load, the EAP generator is supplied with constant voltage or constant electric field.

In order that as much electrical energy can be harvested as possible, the applied load, the voltage or the electric field strength should consequently be as close to the disruptive strength as possible. A fixed value for the applied load is disadvantageous, however, when the amplitude of the waves changes. A smaller wave height is associated with a smaller expansion of the electroactive polymer, so that loading of the polymer can no longer proceed optimally. In practical operation it is further to be taken into account that the loading current for the polymer is not infinitely high, and the loading time is accordingly not infinitely small. In fact, the load is transmitted to the polymer over a certain period of time. The same is true of the unloading of the polymer. When optimising the energy harvest, these time periods must also be taken into consideration in respect of start, end and duration.

It would be desirable, therefore, to improve the closeness of the energy harvesting cycle which can be carried out in practice to the optimum cycle. This involves a control or regulating concept for carrying out the loading/unloading operation.

There is proposed according to the invention a method for harvesting electrical energy from the kinetic energy of water waves with constant load, comprising the steps:

providing a device in the water, the device being so configured that a portion of the device is arranged above the water surface, the device comprising an electroactive polymer which is arranged between electrodes, and mechanical energy from a change in the water level being transmitted in the device to the electroactive polymer;

expanding the electroactive polymer from a minimum expansion $\in_{min}$ to a maximum expansion $\in_{max}$ as a result of the mechanical action of a water wave having a propagation speed c and a wavelength $\lambda$, wherein during the expansion of the electroactive polymer there is applied thereto for a time interval $\Delta t_{load}$ from a time $t_1$ to a time $t_{load}$ a target electrical load $Q^*_{load}$ at which the electrical disruptive strength $E_{max}$ of the electroactive polymer is not exceeded;

relaxing the expanded electroactive polymer from the maximum expansion $\in_{max}$ to the minimum expansion $\in_{min}$ as a result of the decreasing mechanical action of the water wave, wherein during the relaxation of the electroactive polymer it is unloaded for a time interval $\Delta t_{unload}$ from a time $t_2$ to a time $t_{unload}$ to a residual load $Q_0$; and wherein the numerical value of the maximum expansion $\in_{max}$ required for calculating the target electrical load is estimated in advance by:

estimating the maximum wave height $h_{max}$ of a water wave and correlating the maximum wave height $h_{max}$ with the maximum expansion $\in_{max}$ via an assignment rule.

According to the invention there is further proposed a method for harvesting electrical energy from the kinetic energy of water waves with constant voltage, comprising the steps:

providing a device in the water, the device being so configured that a portion of the device is arranged above the water surface, the device comprising an electroactive polymer which is arranged between electrodes, and mechanical energy from a change in the water level being transmitted in the device to the electroactive polymer;

expanding the electroactive polymer from a minimum expansion $\in_{min}$ to a maximum expansion $\in_{max}$ as a result of the mechanical action of a water wave having a propagation speed c and a wavelength $\lambda$, wherein during the expansion of the electroactive polymer there is applied thereto for a time interval $\Delta t_{load}$ from a time $t_1$ to a time $t_{load}$ a voltage $v_{EAP}$ at which the electrical disruptive strength $E_{max}$ of the electroactive polymer is not exceeded;

relaxing the expanded electroactive polymer from the maximum expansion $\in_{max}$ to the minimum expansion $\in_{min}$ as a result of the decreasing mechanical action of the water wave, wherein during the relaxation of the electroactive polymer the voltage $v_{EAP}$ is kept constant and the electroactive polymer is unloaded for a time interval $\Delta t_{unload}$ from a time $t_2$ to a time $t_{unload}$ to a residual load $Q_0$; and wherein the numerical value of the maximum expansion $\in_{max}$ required for calculating the target voltage is estimated in advance by:

estimating the maximum wave height $h_{max}$ of a water wave and correlating the maximum wave height $h_{max}$ with the maximum expansion $\in_{max}$ via an assignment rule.

According to the invention there is further proposed a method for harvesting electrical energy from the kinetic energy of water waves with constant electric field, comprising the steps:

providing a device in the water, the device being so configured that a portion of the device is arranged above the water surface, the device comprising an electroactive polymer which is arranged between electrodes, and mechanical energy from a change in the water level being transmitted in the device to the electroactive polymer;

expanding the electroactive polymer from a minimum expansion $\in_{min}$ to a maximum expansion $\in_{max}$ as a result of the mechanical action of a water wave having a propagation speed c and a wavelength $\lambda$, wherein during the expansion of the electroactive polymer there is applied thereto for a time interval $\Delta t_{load}$ from a time $t_1$ to a time $t_{load}$ a voltage $v_{EAP}$ at which the electrical disruptive strength $E_{max}$ of the electroactive polymer is not exceeded;

relaxing the expanded electroactive polymer from the maximum expansion $\in_{max}$ to the minimum expansion $\in_{min}$ as a result of the decreasing mechanical action of the water wave, wherein during the relaxation of the electroactive polymer the electric field strength $E_{max} = v_{EAP}(t) \cdot z(t)$ is kept constant and the electroactive polymer is unloaded for a time interval $\Delta t_{unload}$ from a time $t_2$ to a time $t_{unload}$ to a residual load $Q_0$; and wherein the numerical value required for continuously updating the electric field strength is estimated from the plate spacing $z(t)$.

Electroactive polymers (EAPs) within the scope of the present invention are in principle polymers which change their shape by the application of a voltage and in particular are dielectric elastomers. Suitable materials are in particular dielectric polyurethane elastomers. The electroactive polymer can be connected to two or more electrodes, which can likewise be expandable. Advantageously, the method according to the invention is carried out in the sea; accordingly the device is provided in the sea. The device can be referred to generally as an electromechanical converter.

In the method according to the invention, an electrical load, voltage or field strength is applied to the expanded electroactive polymer by means of a suitable unit, which can be referred to, for example, as the power electronics or load electronics. On relaxation or relieving, the load is removed again, or the voltage or field strength is kept constant, as a result of which electrical energy is obtained.

In order to calculate the highest possible target electrical load $Q^*_{load}$ or the voltage $v_{EAP}$ or field strength E, knowledge of the maximum expansion $\in_{max}$ is required, as will be stated in greater detail hereinbelow. Because the time of the end of the application of the target load, $t_{load}$, coincides with the maximum expansion $\in_{max}$ and accordingly with the maximum wave height, the time of the start of the application, $t_1$, must necessarily be before the maximum. The same is true for the unloading of the polymer. It is thus necessary to predict when the wave maximum will reach the electromechanical converter and how high the maximum will be.

In the method according to the invention, the expected maximum wave height for the next wave is first estimated. This is likewise explained in greater detail hereinbelow. The required numerical value for the maximum expansion $\in_{max}$ is obtained by correlation with the maximum wave height $h_{max}$. The assignment rule can be, for example, an empirically determined correlation table which assigns an expansion to each deflection of the electromechanical converter. The rule can also be a mathematical description of the specific converter mechanics, that is to say a model concept. A further possibility is based on measured data of the electroactive polymer.

The times determined in the method according to the invention for the loading and unloading of the electroactive polymer can be correlated with an internal time measurement in order to be able to control the polymer on an absolute scale. It is also possible to use external time signals, such as, for example, the signals of atomic clocks transmitted by long-wave.

Overall, the method according to the invention offers the advantage that it possible to react to a change in the wave height over time and accordingly work closer to the energy harvesting optimum even under changing conditions.

Figure 2:
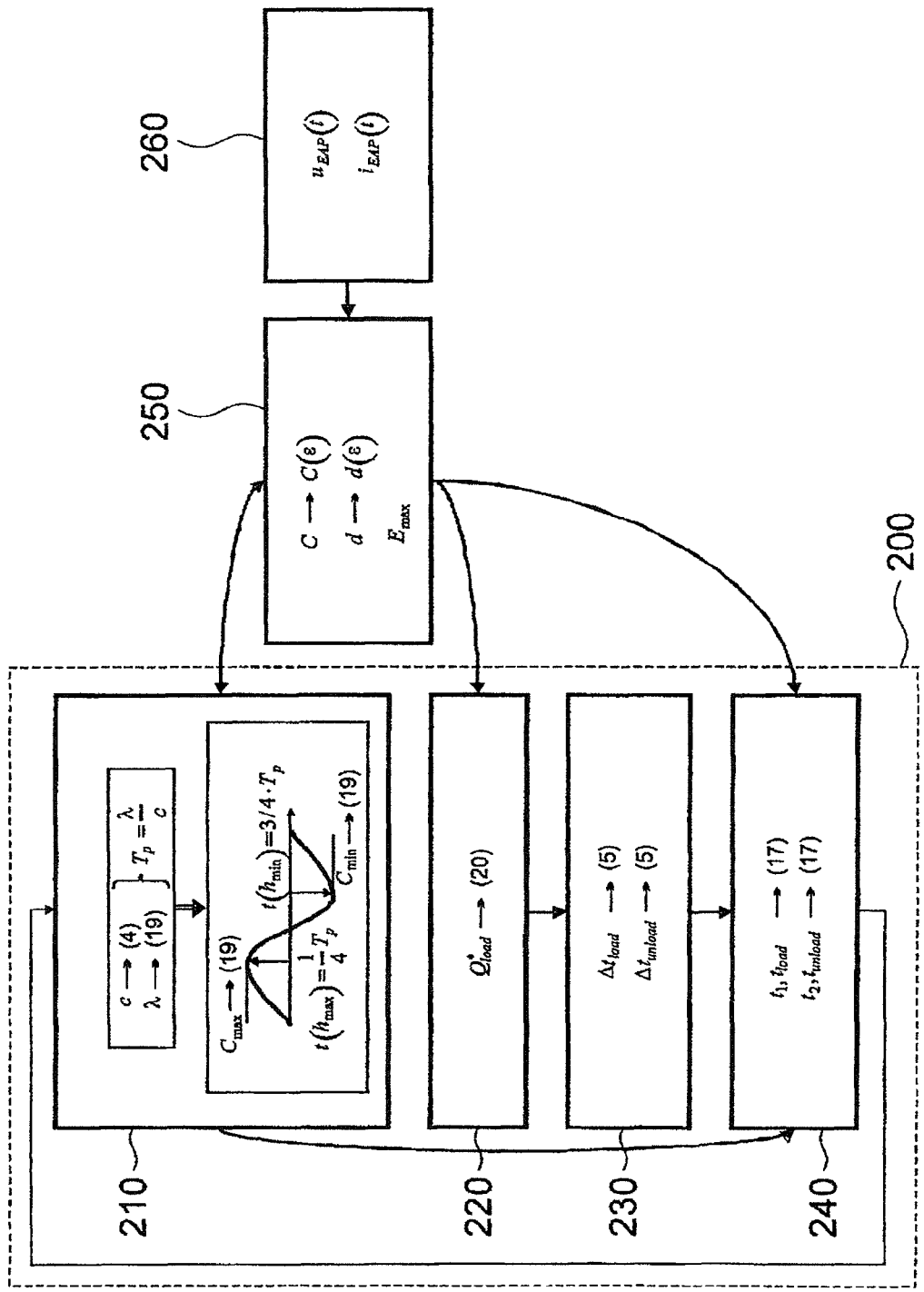
Figure 3:
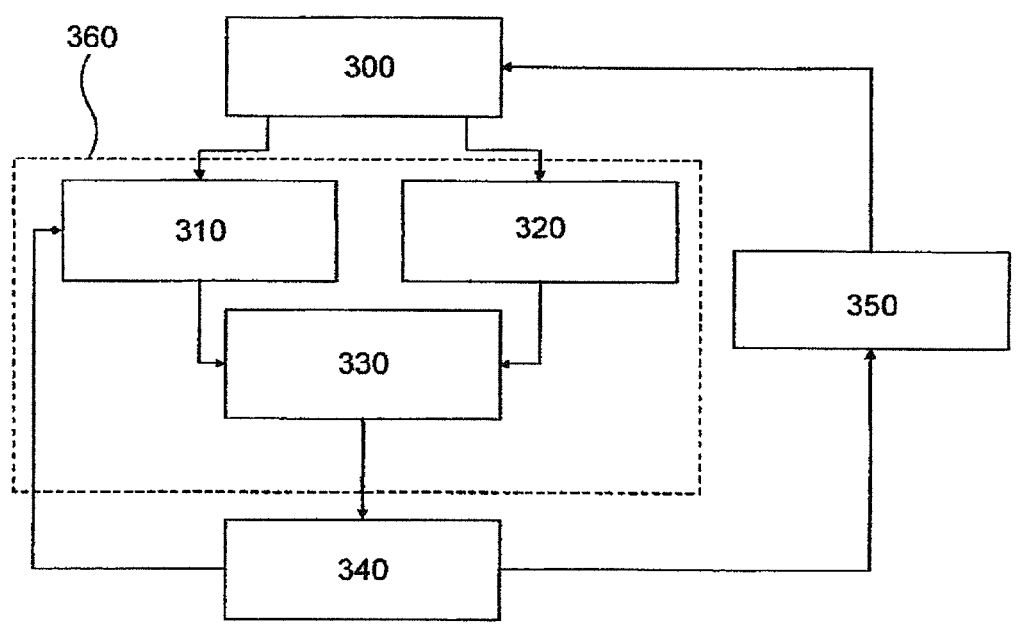

The present invention is described in greater detail with reference to the accompanying drawings, in which:

FIG. 1 shows the superposition of a wave form and the loading and unloading current of the EAP, FIG. 2 shows a flow diagram for a calculation according to the method according to the invention (constant load), FIG. 3 shows a block diagram of a system according to the invention (constant load).

For the purpose of better understanding, the theory of water waves will first be discussed. With water waves, a basic distinction is made between shallow-water and deep-water waves. Shallow-water waves occur in the vicinity of the shore or at a low water depth d. The wavelength is here markedly greater than the water depth: $\lambda \gg d$. Deep-water waves occur at open sea with $\lambda \ll d$ and are particularly suitable for energy harvesting.

In general, deep-water waves propagate sinusoidally at sea. The frequency and propagation speed change only very slowly. The height of the waves is Rayleigh distributed, which means that large wave heights rarely occur. The greatest probability is at smaller amplitudes.

In order to control the loading cycle for the EAP generator, only the fundamental wave of the deep-water wave (transverse wave) must be taken into consideration. This is described by the wavelength $\lambda$, the water depth d, with the location- and time-dependent waveheight h(x,t) and its maximum wave height $h_{max}$, as well as by the propagation speed c. The wave height is given as shown in equation (1):

$$h(x,t) = h_{max} \cdot \cos\left(\frac{2\cdot\pi}{\lambda} \cdot x - \frac{2\cdot\pi}{\lambda} \cdot c \cdot t\right) \quad (1)$$

Based on a whole wave of length $\lambda$, the kinetic energy based on the area A is given according to equation (2):

$$\frac{\overline{E}_{kin}}{A} = \frac{1}{4}\rho \cdot c^2 \cdot \frac{h_{max}^2}{d} \quad (2)$$

Based on a whole wave of length $\lambda$, the potential energy based on the area A is given according to equation (3):

$$\frac{\overline{E}_{pot}}{A} = \frac{1}{4} \cdot \rho \cdot g \cdot h_{max}^2 \quad (3)$$

The potential energy based on the area A, which is to be used for the expansion of the EAP generator, is dependent on the maximum wave height $h_{max}$, acceleration due to gravity g and the density of the water $\rho$.

Compared with the kinetic energy in equation (2), the area-related potential energy changes solely with the wave height, so that the propagation speed c of the wave can ultimately be determined by equalisation:

$$\frac{\overline{E}_{pot}}{A} = \frac{\overline{E}_{kin}}{A} \quad (4)$$

$$\frac{1}{4}\cdot\rho\cdot g\cdot h_{max}^2 = \frac{1}{4}\rho\cdot c^2 \cdot \frac{h_{max}^2}{d}$$

$$c = \sqrt{g\cdot d}$$

According to equation (4), the propagation speed of the wave is merely a function of the acceleration due to gravity g and the water depth d. The latter changes (with a fixed position of the EAP generator) only slightly due to the tides, so that the propagation speed is approximately constant.

With the assumption, having its basis in water-wave theory, that deep-water waves propagate sinusoidally, the optimisation of the energy harvesting cycle is to be described in the following section. The aim here is to determine the optimum loading and unloading cycles in teams of time and to determine the maximum load amount or maximum voltage to be applied in each case while respecting boundary conditions.

Because the loading current is limited by the electronics and the time for applying loads to the EAP generator is finite, determination of the optimum loading and unloading cycles is to be understood as meaning the detection of the optimum loading/unloading time interval. Taking into account the maximum expansion of the EAP occurring in the cycle, the transmitted load amount, which is related to the voltage via the capacity of the EAP, is so to be determined in advance that the electrical disruptive strength $E_{max}$ of the polymer on the one hand is not exceeded at any time but on the other hand leads to maximum energy harvesting.

For the optimisation of the energy harvesting cycle, two criteria for the extremal calculation are to be taken into account, namely the maximization of the energy conversion from mechanical into electrical energy and the minimisation of electrical and mechanical losses.

The optimisation conditions for maximum energy harvesting at constant load are first to be deduced generally.

If the EAP is to be loaded at time $t_1$ with the loading current $i_{load}(t)$ in loading time $\Delta t_{load} = t_{load} - t_1$ to a previously determined target load $Q^*_{load}$, the time-dependent load amount is obtained as:

$$Q^*_{load} = \int_{t_1}^{t_{load}} i_{load}(t)dt \quad (5)$$

When $Q^*_{load}$ is specified and $i_{load}(t)$ is known, the loading time interval $\Delta t_{load} = t_{load} - t_1$ can be determined from equation (5). Determination of the unloading time interval is carried out analogously.

The capacity C of the EAP generator is dependent only on the expansion $\in$, which in turn is a function of the location and time of the water wave but is not a function of the EAP voltage $\mu_{EAP}$.

In general, the energy applied to the EAP generator after termination of the loading cycle is:

$$E_{load} = \int_{t_1}^{t_1+\Delta t_{load}} u_{EAP}(t)\cdot i_{load}(t)dt \quad (6)$$

$$= \int_{t_1}^{t_1+\Delta t_{load}} \frac{Q(t)}{C(\varepsilon(x,t))}\cdot i_{load}(t)dt$$

The energy removed from the EAP generator after termination of the unloading process is:

$$E_{unload} = \int_{t_2}^{t_2+\Delta t_{unload}} u_{EAP}(t)\cdot i_{unload}(t)dt \quad (7)$$

$$= \int_{t_2}^{t_2+\Delta t_{unload}} \frac{Q(t)}{C(\varepsilon(x,t))}\cdot i_{unload}(t)dt.$$

The resulting energy harvest is then:

$$E_{harvest} = E_{unload} - E_{load} \quad (8)$$

From this general equation for the energy harvest, the optimum start points $t_1$ and $t_2$ can be determined by solving the extremum problem $$\max(E_{harvest}(t_1,t_2)) \text{ where } t_2>t_1 \text{ and } t_1+t_2<\lambda/c \quad (9)$$

Because the energy harvest is dependent on two variables, extreme values can only occur when the partial derivatives according to the variables $t_1$, $t_2$ are simultaneously zero:

$$\frac{\partial E_{harvest}(t_1, t_2)}{\partial t_1} = 0, \quad (10)$$

$$\frac{\partial E_{harvest}(t_1, t_2)}{\partial t_2} = 0$$

Solving equation (10) gives value pairs which are extreme values of the area function in equation (10). Whether this is a minimum, maximum or saddle point can be determined with the second derivatives:

$$\frac{\partial^2 E_{harvest}(t_1, t_2)}{\partial t_1^2} = 0, \quad (11)$$

$$\frac{\partial^2 E_{harvest}(t_1, t_2)}{\partial t_2^2} = 0,$$

$$\frac{\partial^2 E_{harvest}(t_1, t_2)}{\partial t_1 \partial t_2} = 0,$$

$$\frac{\partial^2 E_{harvest}(t_1, t_2)}{\partial t_2 \partial t_1} = 0,$$

If the two mixed derivatives according to $t_1$, $t_2$ yield identical results, there is a maximum when the two second derivatives according to $t_1$ or $t_2$ are negative; a minimum is present when the two second derivatives are positive; a saddle point is present when the two second derivatives have different signs.

Irrespective of the result of the two mixed derivatives, the decision as to which extremum is present can generally be carried out with the aid of the Hesse matrix:

$$H = \begin{bmatrix} \frac{\partial^2 E_{harvest}(t_1, t_2)}{\partial t_1^2} & \frac{\partial^2 E_{harvest}(t_1, t_2)}{\partial t_1 \partial t_2} \\ \frac{\partial^2 E_{harvest}(t_1, t_2)}{\partial t_2 \partial t_1} & \frac{\partial^2 E_{harvest}(t_1, t_2)}{\partial t_2^2} \end{bmatrix} \quad (12)$$

If the matrix H is positive definite, a relative minimum is present; if H is negative definite, it is a relative maximum; if H is indefinite, it is not a relative extremum. Where H is positive/negative semidefinite, additional investigations are necessary, as are explained in greater detail in conventional textbooks of mathematics.

In an embodiment of the method according to the invention, the time $t_1$ is calculated according to $$t_1 = \frac{\lambda}{4 \cdot c} - \Delta t_{load}$$

and time $t_2$ is calculated according to $$t_2 = 3 \cdot \frac{\lambda}{4 \cdot c}.$$

Furthermore, at time $t_{load}$ the electroactive polymer has assumed the maximum expansion $\in_{max}$ and at time $t_{unload}$ the electroactive polymer has assumed the minimum expansion $\in_{min}$.

Assuming that the water wave propagates sinusoidally, with an ideally elastic ratio of the polymer an approximately sinusoidal expansion progression $\in$ of the EAP generator is also to be expected. The capacity of the EAP generator will exhibit a strictly monotonically increasing progression with increasing expansion and a strictly monotonically falling progression on relaxation, and as a first approximation can likewise be approximated to a sinusoidal pattern. Accordingly, the arrangement exhibits the maximum capacity $C_{max}$ at maximum expansion $\in_{max}$ and the minimum capacity $C_{min}$ at minimum expansion $\in_{min}$.

If the capacity of the EAP generator changes constantly proportionally to the expansion $\in$ of the EAP generator $$C(t) = C_0 + C_{max} \cdot \sin\left(2 \cdot \pi \cdot \frac{c}{\lambda} \cdot t\right) \quad (13)$$

and if the loading and unloading currents are step-shaped on account of their limiting value $I_{max}$, whereby also $$Q(t) = I_{max} \cdot (t - t_1) \text{ or } Q(t) = -I_{max} \cdot (t - t_2) \quad (14)$$

the maximum energy harvest according to equations (9)-(12) is given precisely when the loading process is terminated at the maximum amplitude of the expansion, which gives the start time $$t_1 = \frac{\lambda}{4 \cdot c} - \Delta t_{load} \quad (15)$$

and when the unloading operation begins at minimum amplitude of the expansion at $$t_2 = 3 \cdot \frac{\lambda}{4 \cdot c} \quad (16)$$

The loading and unloading operation is repeated after a period $T_p = \lambda/c$. The relationship is shown again in FIG. 1.

FIG. 1 shows schematically the superposition of the form of a water wave 100 with the loading and unloading current 110 of the electroactive polymer. Loading of the polymer begins at time $t_1$ to the end time $t_{load}$, which coincides with the maximum wave height. This loading interval is denoted by the reference numeral 120. From time $t_2$, which corresponds to the minimum wave height, to time $t_{unload}$, the polymer is unloaded. This is the unloading interval 130. Energy conversion takes place in each case in interval 140, when the loaded EAP relaxes again.

The optimisation conditions for loading and unloading of the EAP generator also apply analogously for constant voltage and constant electric field. Here, however, it is not the load amount that is kept constant during the relaxation but the voltage or electric field strength.

The energy harvest $E_{harvest}$ by the EAP generator is reduced by losses. In addition to mechanical conversion losses $E_{EAP,mech}$ and electrical losses in the EAP generator $E_{EAP,el}$, additional losses $E_{elec}$ occur through the load electronics during the loading and unloading cycles in dependence on the EAP voltage u(t) and the EAP capacity $C(\in(x, t), Q)$; these are taken into account in the optimisation of the maximum energy harvest and have an influence on the optimum switching times. In this regard, the following relationship is to be used when optimising the time interval according to equations (9)-(12):

$$\max(E_{harvest}-E_{loss}) \text{ where } E_{loss}=E_{EAP,mech}+E_{EAP,el}+E_{elec} \quad (17)$$

The times of minimal amplitude $t(h_{min})$ and maximum amplitude $t(h_{max})$ and the wave height $h_{max}$ are predicted with a suitable sensor and observer concept. For example, with a model of the EAP generator and of the mechanical converter concept the corresponding times of minimum and maximum expansion and expansion of the EAP generator can be determined. The prediction horizon (estimated time $t_{estimate}$) must be between $0 < t_{estimate} < T_p = \lambda/c$, that is to say a period. By means of a spatially offset arrangement between the sensor system and the EAP generator, the prediction horizon can be correspondingly lengthened (for example, when the wave does not reach the sensor system used until after the EAP generator) or shortened (for example, when the wave reaches the sensor system used before the EAP generator).

In dependence on the wavelength and propagation speed, the period $T_p = \lambda/c$ of the wave for a fixed location x is obtained. When a first EAP generator E1, relative to the propagation direction of the wave, is located before a sensor system S, a wave crest reaches the EAP generator E1 around the time:

$$t_{E1} = \frac{x_{sensor\ system} - x_{EAP}}{\lambda} \cdot T_p \quad (18)$$

before the sensor system and the prediction horizon $t_{estimate}$ must be greater by this amount. If a second EAP generator E2 is located after the sensor system S, the prediction horizon $t_{estimate}$ can be correspondingly smaller.

The estimation of the wavelength $\lambda$ can either be carried out with an additional sensor system or determined from the electrical parameters of the EAP generator.

If an additional sensor system is used, the use of acceleration sensors which measure the vertical acceleration of the water surface is appropriate. The fundamental wave can be determined, for example, with a phase-locked loop (PLL) or by transforms such as the Fourier transform and in particular fast Fourier transforms (FFT) or cosine transform.

The times of the extreme values of the wave movement can be estimated from the fundamental wave and the assumption that the wavelength changes with only slight dynamics.

An example of a sequence of steps, which can also include additional steps, is:

1st step: The expansion $\in$ and the time of maximum expansion $t(\in_{max})$ of the EAP generator are first estimated with model and/or sensor assistance.

2nd step: On the basis of the expected expansion of the EAP generator, the permissible target load $Q^*_{load}$ is determined, on the basis of a model, according to equation (20) (or the permissible voltage) at which the electrical disruptive strength will not be exceeded during the energy harvesting cycle.

3rd step: Taking into consideration the current characteristic $i_{load}(t)$, the length of the loading time $\Delta t_{load}$ can be determined using equation (5). The length of the unloading time $\Delta t_{unload}$ is determined analogously.

4th step: By means of the target load amount $Q^*_{load}$ and the loading and unloading times $\Delta t_{load}$ and $\Delta t_{unload}$, the optimum time for the start of the loading process $t_1$ and the unloading process $t_2$ can be determined according to equation (17), taking into account the losses $E_{loss}$.

FIG. 2 shows a flow diagram for such a sequence of steps. In this figure, the references by arrows to figures in brackets means that the parameter can be obtained by means of the equation having the corresponding reference numeral in the description of the present invention. The actual sequence of steps is combined in group 200. Step 260 relates to the determination of the time-dependent voltage $\mu_{EAP}(t)$ and the time-dependent current $i_{EAP}(t)$ of the electroactive polymer. From these values, the expansion-dependent capacity $C(\in)$ and the expansion-dependent electrode spacing $d(\in)$ can be determined in step 250. These values are also used to predict the time of maximum expansion of the EAP in step 210.

The sequence of steps for operation with constant voltage or with constant electric field differs in that the calculation of the target load amount is carried out differently. In the case of operation with constant voltage, the target load amount is determined in advance in such a manner that, at maximum expansion, the permissible field strength is not exceeded. The load amount must then be so adapted that the voltage remains constant. In the case of operation with constant electric field, the target load amount is likewise determined in advance in such a manner that the permissible field strength is not exceeded throughout the entire conversion process. To that end, on the basis of a model, the foil thickness is estimated and, with a specified permissible field strength, the required voltage can then be calculated therefrom. All further steps are unchanged. Using the predicted maximum expansion of the EAP, the target load $Q^*_{load}$ is calculated in step 220 and the times for the loading and unloading intervals $\Delta t_{load}$ and $\Delta t_{unload}$ are calculated in step 230. Finally, from the determined parameters, the times for the start of the loading operation $t_1$ and the unloading operation $t_2$ can be determined.

In an embodiment of the method according to the invention, the wavelength 2 is determined by measuring the vertical acceleration of the water surface by means of an acceleration sensor and:

the oscillation of the resulting acceleration sensor signal gives a wavelength-dependent voltage via a phase-locked loop; and/or the oscillation of the resulting acceleration sensor signal is converted to the domain $c/\lambda$ via a Fourier or cosine transform.

Preferred Fourier transforms are fast Fourier transforms.

In a further embodiment of the method according to the invention, the wavelength $\lambda$ is determined by measuring the voltage present between the electrodes on the electroactive polymer and:

the oscillation of the voltage gives a wavelength-dependent voltage via a phase-locked loop; and/or the oscillation of the voltage is converted to the domain $c/\lambda$ via a Fourier or cosine transform.

Preferred Fourier transforms are fast Fourier transforms. A model-assisted estimation without a sensor system consists in continuously measuring the voltage $\mu_{EAP}$ at the EAP generator, whereby it is possible, on the basis of the load $Q^*_{load}+Q_0$ or $Q_0$ of the EAP generator known to the control system, to draw a conclusion, via a mathematical model, regarding the capacity $C(\in(x,t),Q)$. In order that the expansion-dependent EAP capacity can be detected, a small residual load $Q_0$ must remain on the EAP during the unloading operation, in order that a continued voltage measurement can be carried out during the cycle.

$$C(\varepsilon, t) = \begin{cases} \dfrac{Q_0 + \int_{t_1}^{t_{load}} i_{load}(t)dt}{u_{EAP}(t)} & \text{for } t_1 \le t \le t_{load} \\ \dfrac{Q^*_{load} + Q_0}{u_{EAP}(t)} & \text{for } t_{load} \le t \le t_2 \\ \dfrac{Q^*_{load} + \int_{t_1}^{t_{load}} i_{unload}(t)dt}{u_{EAP}(t)} & \text{for } t_2 \le t \le t_{unload} \\ \dfrac{Q_0}{u_{EAP}(t)} & \text{for } t_{unload} \le t \le t_1 \end{cases} \quad (19)$$

The time-dependent expansion of the EAP generator can be determined via the relationship between the EAP capacity and the EAP expansion according to the formula.

In the case of operation with constant voltage or constant field, the voltage during the relaxation is continuously updated and the capacity can be estimated from the change in the load amount brought about by the change in current. During the expansion phase, the same concept is followed as in the case of constant load, a residual load amount remaining on the EAP generator.

The expansion of the EAP generator is brought about by the wave movement via the mechanical converter concept, from which a conclusion can accordingly be made from the EAP voltage regarding the wave movement. By using the phase-locked loop or transform of the wave movement into the frequency range (analogously to measurement with acceleration sensor), the wavelength can be determined. The times of minimum and maximum expansion $t(\varepsilon_{min})$, $t(\varepsilon_{max})$ are derived from the wavelength and propagation speed.

Knowledge of the wave height is important so that the optimized load amount, which produces a maximum energy harvest but does not lead to damage to the EAP, can be applied to the EAP generator. If the expansion $\varepsilon$ of the EAP generator is largely independent of the applied load ($\varepsilon \ne f(Q)$), if the electrostatic pressure can accordingly be disregarded, the maximum load amount is calculated via the maximum permissible field strength $E_{max}$ of the EAP generator and the electrode spacing d (polymer thickness). There is thus produced, with maximum expansion $\varepsilon_{max}$ of the EAP generator, assuming that the EAP volume is constant, the maximum capacity $C_{max}$ and the minimum electrode spacing $d_{min}$, while with minimum expansion $\varepsilon_{min}$ of the EAP generator, the minimum capacity $C_{min}$ and the maximum electrode spacing $d_{max}$ are obtained. Because both the capacity and the electrode spacing exhibit non-linear behaviour, the entire expansion range must be taken into consideration and the permissible load amount $Q^*_{load}$ to be applied for operation with constant load is obtained with:

$$Q^*_{load} < \min[C(\varepsilon(x,t)) \cdot E_{max} \cdot d(\varepsilon(x,t))] \quad (20)$$

If during the expansion of the EAP generator the capacity is calculated, as proposed with equation (18), and in an analogous manner also the electrode spacing d by a voltage measurement, the target load $Q^*_{load}$ can be determined from their estimated progression according to equation (20). An estimation of the wave height therefrom is likewise possible, although it is not required for the optimum control of the EHC.

On the basis of the derived relationships, the time $t(\varepsilon_{max})$, $t(\varepsilon_{min})$ and the amplitude of the maximum and minimum expansion of the EAP generator should be determined in advance for each cycle. However, because the wavelength λ in particular changes only slowly and within narrow limits, only the maximum expansion $\varepsilon_{max}$ must be estimated in each cycle.

In a further embodiment of the method according to the invention, load is removed from the electroactive polymer in the event that the actual wave height is so much higher than the estimated wave height that the disruptive strength of the electroactive polymer is exceeded with the applied load. Preferably, in this case, where $|E| \ge E_{max}$, load is removed during the energy harvesting cycle. By removing the load, damage to the EAP generator can be prevented.

In a further embodiment of the method according to the invention, the device is:
 a buoy;
 an axially segmented chain of fluid-filled bodies of a material comprising an electroactive polymer; or
 an arrangement of floating bodies, connected to one another by a swivel joint, having eccentrically arranged, biased sections of a material comprising an electroactive polymer, which sections expand and relax oppositely to one another when the floating bodies perform a bending movement.

A buoy, owing to its buoyancy, follows the rising water level in the case of a wave crest and undergoes an acceleration. An additional weight is attached to the buoy. Owing to the inertia of the additional weight, the relative spacing between the buoy housing and the additional weight will increase in this phase, as a result of which the EAP generator is expanded.

Likewise, when the buoy moves into the wave trough there is a reduction in the relative spacing between the buoy housing and the additional weight. In order to use the EAP generator as efficiently as possible, the time of minimum expansion of the polymer is required.

From a quasi-statistical point of view, loading of the arrangement takes place in this application at a wave crest. Unloading of the EAP generator accordingly takes place in the wave trough. Owing to the mechanical oscillating arrangement, phase shifts can result between the wave surface and the EAP expansion, and these can be taken into account when using a sensor system by a converter model.

The axially segmented chain of fluid-filled bodies is also referred to as an "anaconda" arrangement. It has mutually communicating, fluid-filled bodies of a material comprising an electroactive polymer. As a result of the lifting of the chain or hose on the wave crest, the fluid located in the hose flows into the wave troughs. Owing to the low stiffness of the electroactive polymer, the cross-section is increased in the wave trough (expansion) and reduced on the wave crest (relaxation).

Phase shifts between the wave movement and the EAP expansion, which arise owing to the dynamics of the fluid in the EAP, can be taken into account here too in the algorithm for optimised EHC control by a corresponding converter model.

The arrangement of floating bodies connected together by a swivel joint is also referred to as a "Pelamis" arrangement. It is so constructed that two floating bodies are connected by a swivel joint. Biased EAPs, which expand and relax oppositely to one another when the Pelamis arrangement bends, are integrated eccentrically. The rotation in the joint is achieved by attaching weights in both floating bodies close to the joint.

This converter concept too is taken into consideration in optimised control algorithms according to the explanations relating to the preceding two concepts.

The present invention further provides a system for harvesting electrical energy from the kinetic energy of water waves and which is suitable for carrying out the method according to the invention, comprising:
- a device which is so configured that, when the device is placed in the water, a portion of the device is arranged above the water surface, the device comprising an electroactive polymer which is arranged between electrodes, and mechanical energy from a change in the water level being transmitted in the device to the electroactive polymer;
- a sensor unit for obtaining sensor data regarding the water waves and/or the electroactive polymer;
- a power unit for applying electrical load to the electroactive polymer and for unloading the electroactive polymer; and
- a control unit, which is configured to process received data from the sensor unit in a calculation algorithm according to a previously defined data model and to control the power electronics as a result of the calculation, wherein the calculation algorithm further includes the estimation of the maximum wave height of future water waves that are incident on the device.

The device which is part of the system according to the invention corresponds to the device in the method according to the invention. Therefore, in order to avoid repetition, reference is made to the explanations relating thereto. The same is likewise true in relation to preferred embodiments of the device.

A system according to the invention is explained further with reference to FIG. 3, but without being limited thereto. This figure shows a block diagram of a system according to the invention. The element 300 represents the sensor unit, which obtains data regarding the water waves and/or the electroactive polymer 350.

The data from the sensor unit 300 can be processed via a mathematical model and/or a mechanical concept of the electromechanical converter 310 and then passed to a calculation unit 330. Likewise, the data can flow into a model of the waves 320. The calculation unit 330 calculates specified values for power electronics or a power unit 340, using corresponding algorithms. Such specified values are in particular the load amount to be transmitted to the electroactive polymer in the device and the times for the start and end of loading and unloading.

The control unit 360 in the system according to the invention comprises the elements 310, 320 and 330.

By means of the power unit 340, an electrical load is applied to the electroactive polymer 350 and, after the end of the energy conversion phase, the electrical energy is removed again. For calibration of the calculation models, the power unit 340 can be in communication with the model unit 310.

In an embodiment of the system according to the invention, the sensor unit comprises an acceleration sensor remote from the device. The acceleration sensor floats preferably on the water surface and measures the variation in the height thereof as a result of wave movements. Details thereof have already been explained in relation to the method according to the invention.

In a further embodiment of the system according to the invention, the sensor unit measures the voltage present between the electrodes on the electroactive polymer and the spacing of the electrodes on the electroactive polymer. Details thereof have already been explained in relation to the method according to the invention.

The present invention further provides a computer program product, comprising commands which can be executed by a microprocessor for carrying out the calculations in the method according to the present invention.

What is claimed is:

1. Method for harvesting electrical energy from the kinetic energy of water waves, comprising the steps:
   providing a device in the water, the device being so configured that a portion of the device is arranged above the water surface, the device comprising an electroactive polymer which is arranged between electrodes, and mechanical energy from a change in the water level being transmitted in the device to the electroactive polymer;
   expanding the electroactive polymer from a minimum expansion $\in_{min}$ to a maximum expansion $\in_{max}$ as a result of the mechanical action of a water wave having a propagation speed c and a wavelength $\lambda$,
   wherein during the expansion of the electroactive polymer there is applied thereto for a time interval $\Delta t_{load}$ from a time $t_1$ to a time $t_{load}$ a target electrical load $Q^*_{load}$ at which the electrical disruptive strength $E_{max}$ of the electroactive polymer is not exceeded;
   relaxing the expanded electroactive polymer from the maximum expansion $\in_{max}$ to the minimum expansion $\in_{min}$ as a result of the decreasing mechanical action of the water wave,
   wherein during the relaxation of the electroactive polymer it is unloaded during a time interval $\in t_{unload}$ from a time $t_2$ to a time $t_{unload}$ to a residual load $Q_0$; and
   wherein the numerical value of the maximum expansion $\in_{max}$ required for calculating the target electrical load is estimated in advance by:
   estimating the maximum wave height $h_{max}$ of a water wave and
   correlating the maximum wave height $h_{max}$ with the maximum expansion $\in_{max}$ via an assignment rule.

2. Method according to claim 1, wherein the time $t_1$ is calculated according to $$t_1 = \frac{\lambda}{4 \cdot c} - \Delta t_{load},$$

time $t_2$ is calculated according to $$t_2 = 3 \cdot \frac{\lambda}{4 \cdot c},$$

wherein further at time $t_{load}$ the electroactive polymer has assumed the maximum expansion $\in_{max}$ and at time $t_{unload}$ the electroactive polymer has assumed the minimum expansion $\in_{min}$.

3. Method according to claim 2, wherein the wavelength $\lambda$ is determined by measuring the vertical acceleration of the water surface by means of an acceleration sensor and:
   the oscillation of the resulting acceleration sensor signal gives a wavelength-dependent voltage via a phase-locked loop; and/or
   the oscillation of the resulting acceleration sensor signal is converted to the domain $c/\lambda$ via a Fourier or cosine transform.

4. Method according to claim 2, wherein the wavelength $\lambda$ is determined by measuring the voltage present between the electrodes on the electroactive polymer and:
   the oscillation of the voltage gives a wavelength-dependent voltage via a phase-locked loop; and/or the oscillation of the voltage is converted to the domain $c/\lambda$ via a Fourier or cosine transform.

5. Process according to claim 1, wherein load is removed from the electroactive polymer in the event that the actual wave height is so much higher than the estimated wave height that the disruptive strength of the electroactive polymer is exceeded with the applied load.

6. Method according to claim 1, wherein the device is:
a buoy;
an axially segmented chain of fluid-filled bodies of a material comprising an electroactive polymer; or
an arrangement of floating bodies, connected to one another by a swivel joint, having eccentrically arranged, biased sections of a material comprising an electroactive polymer, which sections expand and relax oppositely to one another when the floating bodies perform a bending movement.

7. System for harvesting electrical energy from the kinetic energy of water waves and which is suitable for carrying out the method according to claim 1, comprising:
a device which is so configured that, when the device is placed in the water, a portion of the device is arranged above the water surface, the device comprising an electroactive polymer which is arranged between electrodes, and mechanical energy from a change in the water level being transmitted in the device to the electroactive polymer;
a sensor unit for obtaining sensor data regarding the water waves and/or the electroactive polymer;
a power unit for applying electrical load to the electroactive polymer and for unloading the electroactive polymer; and
a control unit, which is configured to process received data from the sensor unit in a calculation algorithm according to a previously defined data model and to control the power electronics as a result of the calculation, wherein the calculation algorithm further includes the estimation of the maximum wave height of future water waves that are incident on the device.

8. System according to claim 7, wherein the sensor unit comprises an acceleration sensor remote from the device.

9. System according to claim 7, wherein the sensor unit measures the voltage present between the electrodes on the electroactive polymer and the spacing of the electrodes on the electroactive polymer.

10. Computer program product, comprising commands which can be executed by a microprocessor for carrying out the calculations in the method according to claim 1.

* * * * *